F. G. JOHNSON.
STOCK WATERING TANK.
APPLICATION FILED FEB. 24, 1919.
1,337,075.
Patented Apr. 13, 1920.
2 SHEETS—SHEET 2.
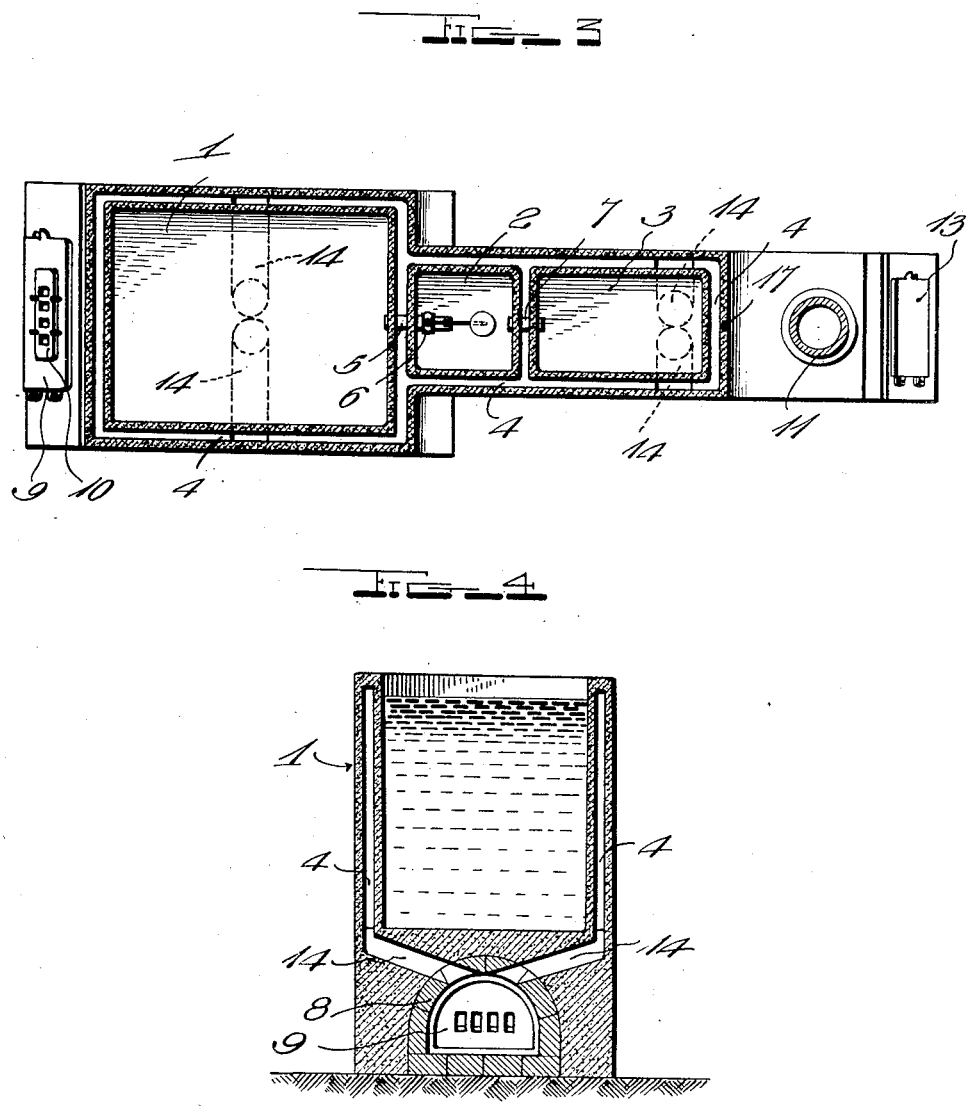
Inventor
Felix A. Johnson
Witness
By
Attorneys

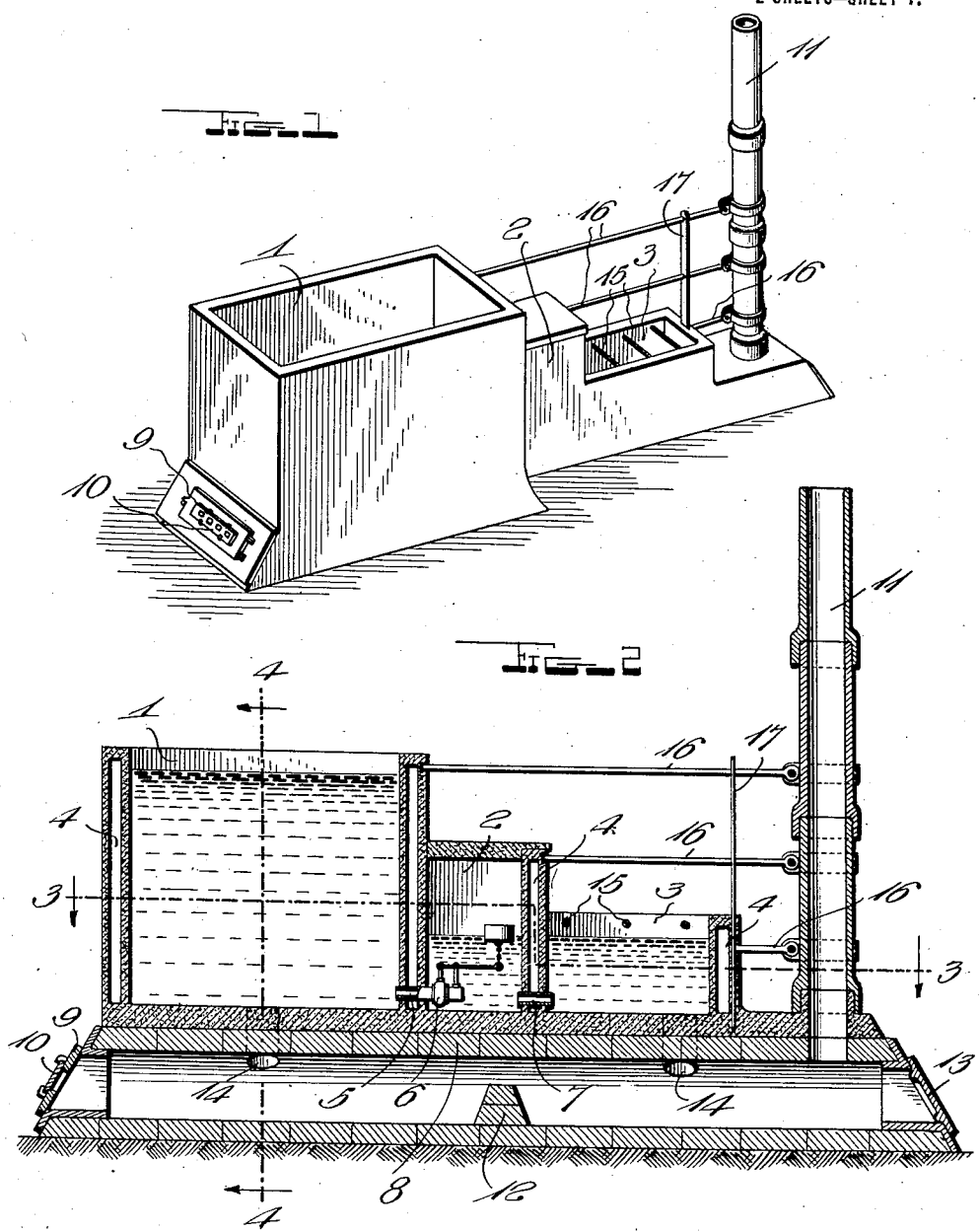

UNITED STATES PATENT OFFICE.

FELIX G. JOHNSON, OF CLARINDA, IOWA, ASSIGNOR OF ONE-HALF TO MARTHA E. JOHNSON.

STOCK-WATERING TANK.

1,337,075.  Specification of Letters Patent.  Patented Apr. 13, 1920.

Application filed February 24, 1919. Serial No. 278,884.

*To all whom it may concern:*

Be it known that I, FELIX G. JOHNSON, a citizen of the United States, residing at Clarinda, in the county of Page and State of Iowa, have invented certain new and useful Improvements in Stock-Watering Tanks; and I do declare the following to be a full, clear, and exact description of the invention, such as will enable others skilled in the art to which it appertains to make and use the same.

My invention has for its object to provide an extremely simple and inexpensive, yet a highly efficient and durable cement water tank for cattle, horses and hogs, novel provision being made for heating the device to prevent the water from freezing; also the tank will keep the water much cooler in hot weather.

With the foregoing in view, the invention resides in the novel construction and association of parts hereinafter fully described and claimed, reference being made to the accompanying drawings which form a part of this application.

Figure 1 is a perspective view of a watering tank constructed in accordance with my invention.

Fig. 2 is a central vertical longitudinal section.

Fig. 3 is a horizontal section on the plane indicated by the line 3—3 of Fig. 2.

Fig. 4 is a vertical transverse section on the plane designated by the line 4—4 of Fig. 2.

In the drawings above briefly described, the numeral 1 designates a relatively large tank to contain water for cattle and horses. 2 has reference to a float tank joined to one end of the tank 1, and the numeral 3 indicates a hog watering trough joined to the outer end of the tank 2. The two tanks 1 and 2 and the trough 3 are all formed of cement and are each provided with hollow walls 4 which communicate with each other.

A pipe 5 leads from the tank 1 into the float tank 2 and by means of a float controlled valve 6 the discharge of water into said tank 2 from the larger tank 1, is controlled; and a pipe 7 leads from the tank 2 into the trough 3 so that the water in the latter will be maintained at the same level as that in the former.

An arch 8, preferably constructed of brick, extends beneath the tanks 1 and 2 and the trough 3 and is adapted to contain a fire, one end of said arch having a fuel inlet door 9 provided with a suitable draft damper 10, while a stack 11 leads from the other end of the arch, said stack being preferably formed of tile. A bridge wall 12 is preferably provided across the central portion of the arch 8 to insure the proper draft, and a clean-out door or the like 13 may be provided at the rear end of said arch.

Passages 14 extend from the arch 8 into the hollow walls 4 and it will be seen that these passages serve to conduct hot air into the walls from the arch, this heating, in addition to that performed by direct radiation from the fire in the arch 8, serving to maintain the entire device at a sufficiently high temperature to prevent freezing of the water. Due to the cement construction, however, the water is not filled with bubbles as is the case when metal tank heaters are used, and I have found that the cement holds its heat a maximum time after the fire has died down, so that the cement construction is for this reason also of advantage over a metal construction.

By preference used in connection with the features above described, are horizontal rods 15 extending across the hog watering trough 3 to prevent hogs from walking into such trough, and additional rods 16 lead from the tanks 1 and 2 and the trough 3, to the stack 11. The rods 16 are secured to a post 17, rising from the outer end of the tank 3 and they serve as means for bracing the stack as well as to prevent horses and cattle from walking over the trough 3 and tank 2.

From the foregoing, taken in connection with the accompanying drawings, it will be seen that I have provided an extremely simple and inexpensive tank for watering both large and small stock and for effectively preventing freezing of the water, even though a low fire is employed; and a tank that will keep the water much cooler in hot weather.

Since probably the best results are obtained from the details disclosed, they may well be followed, but within the scope of the invention as claimed, numerous minor changes may well be made.

What I claim is:

1. In a stock watering device, a cattle and horse tank, a float tank joined to one end of said cattle and horse tank, a hog watering trough joined to one end of said float tank, float controlled means in said float tank for supplying water from said cattle and horse tank to said hog trough, said tanks and said trough having hollow walls in communication with each other, an arch extending beneath both said tanks and under said trough and adapted to contain a fire, fuel and draft inlet means at one end of said arch, a stack leading from the other end of the arch at the exterior of said cattle and horse tank, and passages from said arch into said hollow walls for supplying heat to the latter.

2. In a stock watering device, a cattle and horse tank, a float tank joined to one end of said cattle and horse tank, a hog trough joined to one end of said float tank, float controlled means in said float tank for supplying water from said cattle and horse tank to said hog trough, said tanks and said trough being disposed in alinement and having hollow walls in communication with each other, a straight arch extending longitudinally beneath both of said alined tanks and under said trough and adapted to contain a fire, fuel and draft inlet means at one end of said arch, a stack leading from the other end of the arch at the exterior of said cattle and horse tank, and passages from said arch into said hollow walls for supplying heat to the latter.

In testimony whereof I have hereunto set my hand.

FELIX G. JOHNSON.